US011976346B2

United States Patent
Deodeshmukh et al.

(10) Patent No.: US 11,976,346 B2
(45) Date of Patent: May 7, 2024

(54) SOLAR TOWER SYSTEM CONTAINING MOLTEN CHLORIDE SALTS

(71) Applicants: HAYNES INTERNATIONAL, INC., Kokomo, IN (US); ICL-IP AMERICA INC., Wilmington, DE (US)

(72) Inventors: Vinay Deodeshmukh, Carmel, IN (US); Reinhard Effenberger, Haifa (IL)

(73) Assignees: Haynes International, Inc., Kokomo, IN (US); ICL-IP America, Inc., Wilmington, DE (US)

( * ) Notice: Subject to any disclaimer, the term of this patent is extended or adjusted under 35 U.S.C. 154(b) by 584 days.

(21) Appl. No.: 16/647,938

(22) PCT Filed: Oct. 11, 2018

(86) PCT No.: PCT/US2018/055368
§ 371 (c)(1),
(2) Date: Mar. 17, 2020

(87) PCT Pub. No.: WO2019/075177
PCT Pub. Date: Apr. 18, 2019

(65) Prior Publication Data
US 2020/0291505 A1 Sep. 17, 2020

Related U.S. Application Data

(60) Provisional application No. 62/572,059, filed on Oct. 13, 2017.

(51) Int. Cl.
*F24S 10/70* (2018.01)
*C22C 30/00* (2006.01)
(Continued)

(52) U.S. Cl.
CPC .............. *C22C 30/00* (2013.01); *F24S 10/70* (2018.05); *F24S 60/10* (2018.05); *F24S 70/12* (2018.05);
(Continued)

(58) Field of Classification Search
CPC . F24S 10/70; F24S 80/10; F24S 80/20; C22C 30/00
See application file for complete search history.

(56) References Cited

U.S. PATENT DOCUMENTS 4,981,647 A * 1/1991 Rothman .............. C22C 38/001
420/586
5,862,800 A * 1/1999 Marko .................... F24S 20/20
126/677
(Continued)

FOREIGN PATENT DOCUMENTS

| CN | 103776180 A | 5/2014 |
| CN | 105143481 A | 12/2015 |

(Continued)

OTHER PUBLICATIONS

International Search Report for PCT/US2018/055368 dated Jan. 2, 2019.
(Continued)

*Primary Examiner* — Jorge A Pereiro
(74) *Attorney, Agent, or Firm* — Buchanan Ingersoll & Rooney PC

(57) ABSTRACT

A solar tower system is disclosed in which the heat transfer media is a molten salt at a temperature greater than 650° C. The components that carry or hold the molten salt are made from commercially available alloys made by Haynes International and sold under the designations HR-120® alloy,
(Continued)

230® alloy and 233™ alloy whose compositions are described herein. The molten salt preferably is MgCl$_2$—KCl.

12 Claims, 6 Drawing Sheets

(51) Int. Cl.
*F24S 60/10* (2018.01)
*F24S 70/12* (2018.01)
*F24S 80/00* (2018.01)
*F24S 80/10* (2018.01)
*F24S 80/20* (2018.01)

(52) U.S. Cl.
CPC ............. *F24S 80/10* (2018.05); *F24S 80/20* (2018.05); *F24S 2080/01* (2018.05)

(56) References Cited

U.S. PATENT DOCUMENTS

| | | | |
|---|---|---|---|
| 9,499,699 B1* | 11/2016 | Hall | C23C 4/134 |
| 2013/0152917 A1 | 6/2013 | Couturier et al. | |
| 2014/0290248 A1* | 10/2014 | Kobayashi | B21D 53/06 |
| | | | 60/641.11 |
| 2016/0097376 A1* | 4/2016 | Wasyluk | F24S 40/00 |
| | | | 126/618 |
| 2016/0115945 A1* | 4/2016 | Barsi | F24S 60/10 |
| | | | 126/618 |
| 2016/0313032 A1* | 10/2016 | Khaliq | F25B 25/00 |
| 2017/0038096 A1 | 2/2017 | Hilliard | |
| 2017/0067667 A1* | 3/2017 | Choi | F24S 60/10 |
| 2018/0010824 A1* | 1/2018 | Drost | F24S 80/30 |

FOREIGN PATENT DOCUMENTS

| | | | | |
|---|---|---|---|---|
| EP | 1873397 A2 | 1/2008 | | |
| EP | 2971205 B1 | 1/2016 | | |
| GB | 2543084 A | * | 4/2017 | ............. C09K 15/02 |
| JP | 2015537181 A | 12/2015 | | |
| JP | 2016050328 A | 4/2016 | | |
| JP | 2016196877 A | 11/2016 | | |
| JP | 2016196880 A | 11/2016 | | |
| JP | 2016536752 A | 11/2016 | | |
| WO | 2011084902 A2 | 7/2011 | | |
| WO | 2011084902 A3 | 7/2011 | | |
| WO | 2011086215 A1 | 7/2011 | | |
| WO | 2011154534 A1 | 12/2011 | | |
| WO | WO-2011154534 A1 | * | 12/2011 | ............. F24S 10/70 |
| WO | 2012037532 A2 | 3/2012 | | |
| WO | 2014197088 A1 | 12/2014 | | |
| WO | WO-2016179199 A1 | * | 11/2016 | ............. F03G 6/067 |
| WO | 2017060741 A1 | 4/2017 | | |
| WO | 2018142292 A1 | 8/2018 | | |

OTHER PUBLICATIONS

Special Metals, Inconel® alloy 600 brochure, Sep. 2008, available at www.specialmetals.com.

Special Metals, Incoloy® alloy 800H & 800HT brochure, Sep. 2004, available at www.specialmetals.com.

"High Temperature Corrosion of Inconel 600 in NaCl—KCl Molten Salts" G. Salinas-Solano, et al., Research Article | Open Access https://www.hindawi.com/journals/amse/2014/696081/ vol. 2014, Article ID 696081 | https://doi.org/10.1155/2014/696081 Dec. 30, 2014.

Chilean Search Report for Application No. 202103147 dated Feb. 24, 2023.

* cited by examiner

SOLAR TOWER SYSTEM CONTAINING MOLTEN CHLORIDE SALTS

CROSS-REFERENCE TO RELATED APPLICATION

This application claims priority to U.S. Provisional Patent Application Ser. No. 62/572,059 filed Oct. 13, 2017, the contents of which are incorporated herein by reference.

BACKGROUND OF THE INVENTION

1. Field of the Invention

This invention relates to solar cell towers which absorb heat from sunlight and transfer that heat for use in generating electricity using molten salt as the heat transport fluid.

2. Description of the Related Art

Surfaces of many materials will be heated when exposed to sunlight over a period of time. The art has developed systems to capture this heat for use in generating electricity or for heating buildings and other environments. One type of system known as a solar tower system has a series of heat absorption tubes or receivers that are exposed to sunlight and heated by that sunlight. The heat absorption tubes contain a heat transfer media which is directed from the heat absorption tubes to heat exchangers. There is a storage tank in the system which contains the heat transfer media. Molten sodium-potassium nitrate salt has been used as a heat transfer media in such solar tower systems. In those systems the sodium-potassium nitrate salt is heated to about 565° C.

U.S. Pat. No. 5,862,800 discloses a solar tower system which contains sodium-potassium nitrate salt at a temperature of about 565° C. The patent teaches that 625 alloy should be used in this system because that alloy when at a temperature of 605° C. has excellent resistance to corrosion from molten sodium-potassium nitrate salt, high resistance to chloride stress corrosion cracking due to either impurities in the molten salt or externally derived chlorides from the atmosphere or thermal insulation, a low coefficient of thermal expansion, good thermal conductivity, excellent creep and yield strengths and outstanding mechanical and thermal fatigue resistance.

304 and 316 austenitic stainless steels and Incoloy® 800 nickel-iron-chromium alloy have also been used for the receiver in the sodium-potassium nitrate salt solar tower systems. These alloys possesses high coefficients of thermal expansion, low yield and creep strengths, low thermal conductivities, low thermal fatigue properties but are susceptible to chloride stress corrosion cracking.

Alloys that are used in solar tower systems should be resistant to the molten salt's strong corrosion properties, resistant to chloride stress corrosion cracking, economically fabricated, weldable, acceptable to the ASME Boiler and Pressure Vessel Code and able to withstand the severe thermal strains caused by the through wall and across diameter temperature gradients. These strains, which are directly proportional to the material's thermal expansion coefficient, set the receiver's size by restricting the absorbed solar flux to a value determined by the material's allowable fatigue strain level for the imposed number of daily sun and cloud cover cycles over the receiver's lifetime.

There is currently a need for solar tower systems that can operate at higher temperatures from 650° C. up to as high as 1000° C. Such a system must have a salt media that is in a molten state at these high temperatures. The absorption tubes, heat exchangers and storage tanks in such a system must be made from a material, preferably a metal alloy, that is corrosion resistant to the molten salt at temperatures of between 650° C. and 1000° C. The alloys must also possesses high coefficients of thermal expansion, low yield and creep strengths, low thermal conductivities and low thermal fatigue at these high temperatures.

Although sodium-potassium nitrate salts have been used in solar tower systems operating at a temperature of about 565° C., these salts are not suitable for use at higher temperatures, particularly temperatures as high as 800° C. to 1000° C. For these applications one needs a salt that has a much higher freezing temperature than sodium-potassium nitrate salts.

While there are a number of known alloys which are sold for use in high temperature applications little is known about the corrosion resistance of these alloys when exposed to molten salt at higher temperatures from 650° C. up to as high as 1000° C. Although one skilled in the art might expect that any alloy which has been used in other high temperature applications of about 565° C. could be used in a molten salt solar tower system operating at temperatures of temperatures from 650° C. up to as high as 1000° C., we have found that this is not true. Many of them do not have both the corrosion resistance and the mechanical properties needed for molten salt solar tower system operating at temperatures from 650° C. up to as high as 1000° C. Only certain alloy compositions disclosed here are suitable for such systems.

SUMMARY OF THE INVENTION

We provide a solar tower system in which the heat transfer media is a molten salt at a temperature greater than 650° C. and the components that carry or hold the molten salt are made from commercially available alloys made by Haynes International and sold under the designations HR-120® alloy, 230® alloy and 233™ alloy. The nominal composition and compositions of alloys within the technical specifications for these Haynes alloys are provided below. These alloys have the desired corrosion resistance and the mechanical properties and can be used for some or all of these absorption tubes, heat exchanges and storage. Preferably the molten salt is $MgCl_2$—KCl molten salt.

In alternative embodiments in which the molten salt is heated to a temperature above 800° C., HR-120® alloy is used only for the storage tank and 230® alloy or 233™ alloy is used for the receivers and other components that carry the molten salt.

The components that are made from 230® alloy or 233™ alloy could be coated with zirconium or magnesium to improve corrosion resistance.

We may add magnesium to the molten salt because magnesium will act as a corrosion inhibitor. Preferably 1.15 mol % magnesium is used.

Other objects and advantages of this solar cell system will become apparent from a description of certain present preferred embodiments shown in the drawings.

DESCRIPTION OF THE PREFERRED EMBODIMENTS

Figure 1:
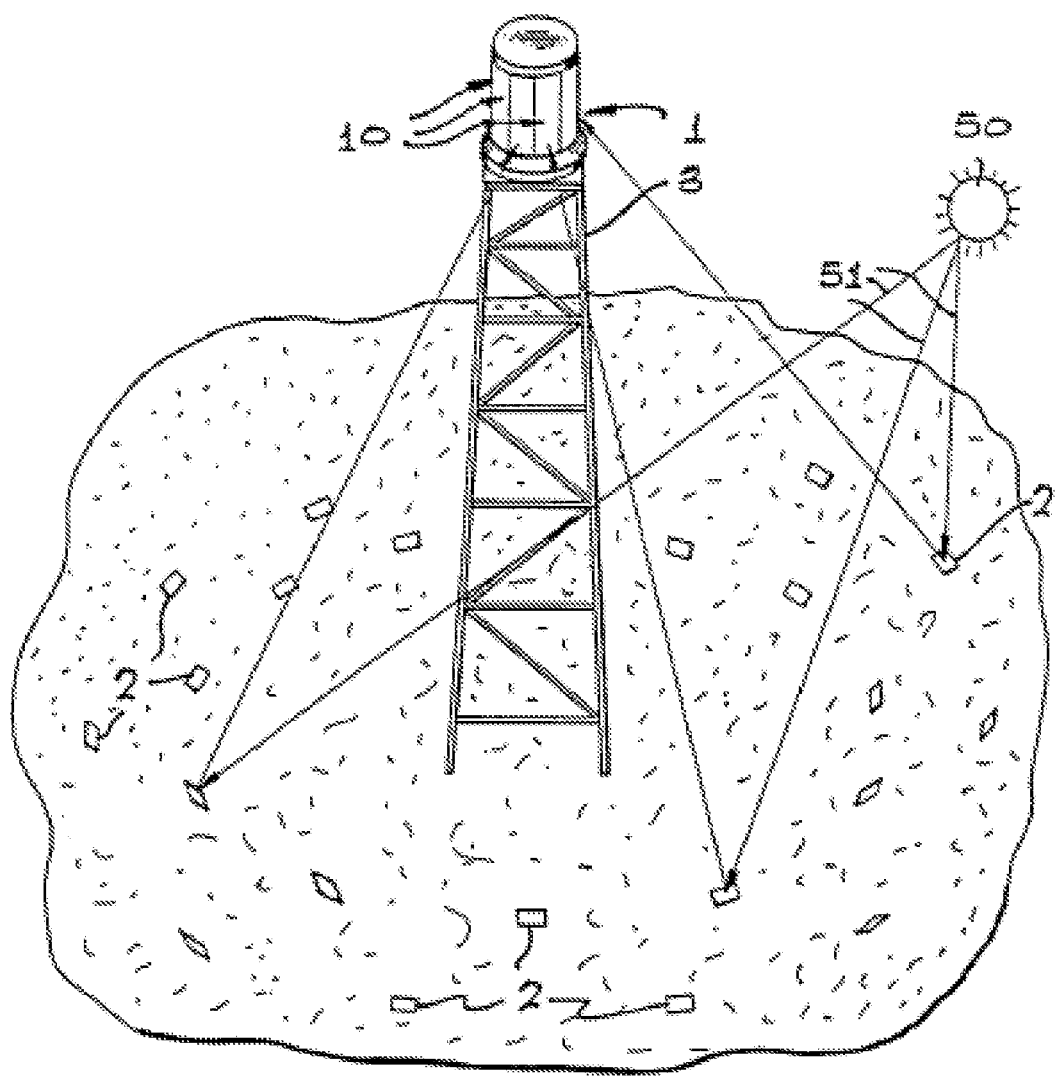
FIG. 1 is a perspective view of a solar tower system known in the prior art which can be modified in accordance with the present invention to use molten salt at temperatures from 650° C. to as high as 800° C. to 1000° C. as the heat transfer media.
Figure 3:
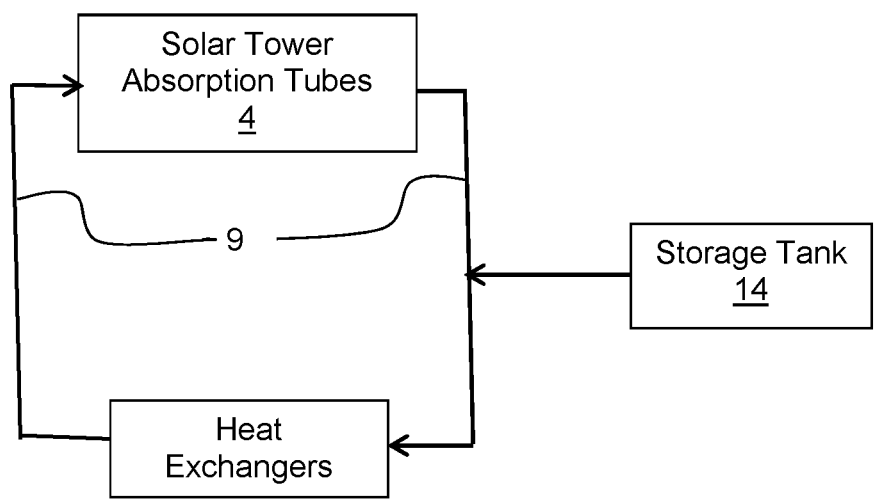
FIG. 3 is a block diagram of a heating system in which a solar tower system can be used.

Referring to FIGS. 1 and 3 a solar cell system of the type disclosed in U.S. Pat. No. 5,862,800 has a solar central cylindrical receiver 1 which is surrounded by a field of heliostats 2. The receiver 1 is mounted on a tower 3 to provide the most efficient focal point height. The receiver 1 is made up of molten salt solar absorption panels 10. The sun 50 provides solar rays 51 which shine on heliostats 2. The solar rays 51 are reflected by the heliostats 2 to the solar central cylindrical receiver 1. The molten salt solar absorption panels 10 are heated by the solar rays. The hot molten salt inside the panel tubes 4 transports the heat to heat exchangers which may use the thermal energy for process heat or to generate electricity.

Figure 2:
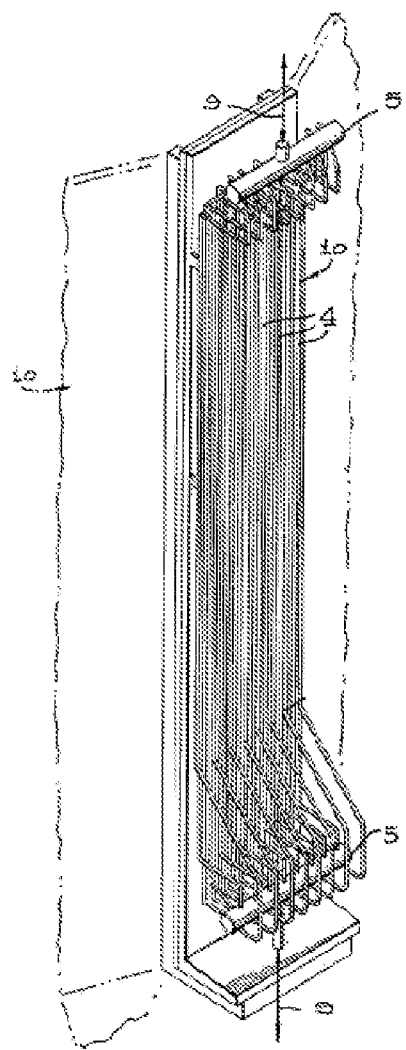
FIG. 2 is an isometric view of a typical molten salt, solar absorption panel.

A typical molten salt solar absorption panel 10 shown in FIG. 2 has absorption tubes 4 which can be of seamless, welded or welded and drawn construction and headers 5. The molten salt flow enters or exits the solar absorption panel 10 from or into conduits 9 through its headers 5. In the embodiment shown in FIG. 1 the receiver 1 is composed of multiple panels 10 arranged in two circuits, each with eight panels, having a serpentine flow path and forming a polyhedral, cylindrical surface.

In our solar tower system the molten salt heat transfer media is heated to a temperature greater than 650° C. up to as high as 1000° C. Referring to FIG. 3 heated molten salt is conveyed from the absorption tubes 4 in the receivers 10 to heat exchangers 12 and then returned to the receivers 19 through conduits 9. A storage tank 14 for the molten salt is provided in the system.

We have found that molten chloride salts are better candidates for use in molten salt solar tower systems that operate temperatures from 650° C. up to as high as 1000° C. In particular we prefer to provide MgCl₂—KCl molten salt. Other suitable salts may include halides composed of LiCl, NaCl, KCl, MgCl₂ or CaCl₂, as individual entities or as binary, ternary, quaternary or quinary mixtures, which are at least partially molten in the temperature range 300° C.-1000° C. One may also use molten halides composed of LiBr, NaBr, KBr, MgBr₂ or CaBr₁₂, as individual entities or as binary, ternary, quaternary or quinary mixtures, which are at least partially molten in the temperature range 300° C.-1000° C. Another suitable salt may be molten halides composed of LiX, NaX, KX, MgX₂ or CaX₂ (where X can be Cl or Br), as individual entities or as mixtures, which are at least partially molten in the temperature range 300° C.-1000° C. Molten halides composed of LiF, NaF, KF or BeF₂, as individual entities or as binary, ternary or quaternary mixtures, which are at least partially molten in the temperature range 300° C.-1000° C. may also be used.

The alloys that have been used in solar cells that operate at temperature below 600° C. do not have the corrosion resistance and the mechanical properties that are needed for absorption tubes, heat exchangers and storage tanks that contain molten chloride salts at temperatures from 650° C. up to as high as 1000° C. However, we have found that Haynes HR-120® alloy, 230® alloy and 233™ alloy have the desired corrosion resistance and the mechanical properties. They can be used for some or all of these absorption tubes, heat exchanges, conduits and storage tanks.

Corrosion tests were conducted on Haynes HR-120® alloy, 230® alloy, 233™ alloy, 244® alloy and 282® alloy to determine their suitability for use in our solar tower system. Three coupons of each of the alloys were tested for corrosion resistance in molten NaCl—KCl—MgCl₂ or in NaCl—KCl—MgCl₂ combined with 1.5 mol % magnesium which acts a corrosion inhibitor. 230® alloy, 233™ alloy, 244® alloy and 282® alloy were tested at 850° C. HR-120® alloy was tested at 750° C. Six coupons of 230® alloy were coated with zirconium and another six coupons of 230® alloy were coated with magnesium. Three of each of the coated coupons were tested in molten NaCl—KCl—MgCl₂ and three were tested in NaCl—KCl—MgCl₂ combined with 1.5 mol % magnesium. Table 1 lists each of the tests. The tests were repeated on HR-120® alloy and 230® alloy.

TABLE 1

| Test # | Alloy | Salt Composition | Surface Treatment | Inhibitor | emp. (° C.) |
|---|---|---|---|---|---|
| 2.1 | Haynes 282 | NaCl—KCl—MgCl₂* | 120 grit | N/A | 850 |
| 2.2 | Haynes 244 | NaCl—KCl—MgCl₂* | 120 grit | N/A | 850 |
| 2.3 | Haynes 233 | NaCl—KCl—MgCl₂* | 120 grit | N/A | 850 |
| 2.4 | Haynes HR120 | NaCl—KCl—MgCl₂* | 120 grit | N/A | 750 |
| 2.5 | Haynes 282 | NaCl—KCl—MgCl₂* | 120 grit | 1.15 mol % Mg | 850 |
| 2.6 | Haynes 244 | NaCl—KCl—MgCl₂* | 120 grit | 1.15 mol % Mg | 850 |
| 2.7 | Haynes 233 | NaCl—KCl—MgCl₂* | 120 grit | 1.15 mol % Mg | 850 |
| 2.8 | Haynes HR120 | NaCl—KCl—MgCl₂* | 120 grit | 1.15 mol % Mg | 750 |
| 2.9 | Haynes 230 | NaCl—KCl—MgCl₂* | 120 grit | ZrCl₄/ZrCl₃ buffer | 850 |
| 2.10 | Haynes 230 | NaCl—KCl—MgCl₂* | 120 grit | 1.15 mol % MgZn** | 850 |
| 2.11 | Haynes 230 | NaCl—KCl—MgCl₂* | Sputtered Zr | N/A | 850 |
| 2.12 | Haynes 230 | NaCl—KCl—MgCl₂* | Mg-based 11D | N/A | 850 |
| 2.13 | Haynes 230 | NaCl—KCl—MgCl₂* | Sputtered Zr | 1.15 mol % Mg | 850 |
| 2.14 | Haynes 230 | NaCl—KCl—MgCl₂* | Mg-based 11D | 1.15 mol % Mg | 850 |
| 2.15 | Haynes 242 | NaCl—KCl—MgCl₂* | 120 grit | N/A | 850 |
| 2.16 | Haynes 242 | NaCl—KCl—MgCl₂* | 120 grit | 1.15 mol % Mg | 850 |
| 2.17 | Haynes 230 | NaCl—KCl—MgCl₂* | MgO | N/A | 850 |

TABLE 1-continued

| Test # | Alloy | Salt Composition | Surface Treatment | Inhibitor | emp. (° C.) |
|---|---|---|---|---|---|
| 2.18 | Haynes 230 | NaCl—KCl—MgCl$_2$* | MgO | 1.15 mol % Mg | 850 |
| 2.19 | Haynes 230 | NaCl—KCl—MgCl$_2$* | aluminide 1P | N/A | 850 |
| 2.20 | Haynes 230 | NaCl—KCl—MgCl$_2$* | aluminide 1P | 1.15 mol % Mg | 850 |
| 2.21 | Haynes 230 | NaCl—KCl—MgCl$_2$* | aluminide 2D | N/A | 850 |
| 2.22 | Haynes 230 | NaCl—KCl—MgCl$_2$* | aluminide 2D | 1.15 mol % Mg | 850 |

*ICL Dehydrated Carnallite (300278-8-3), 1-6 wt % H$_2$O
**71 at % Mg - 29 at % Zn (m.p. 347° C.)

Figure 4:
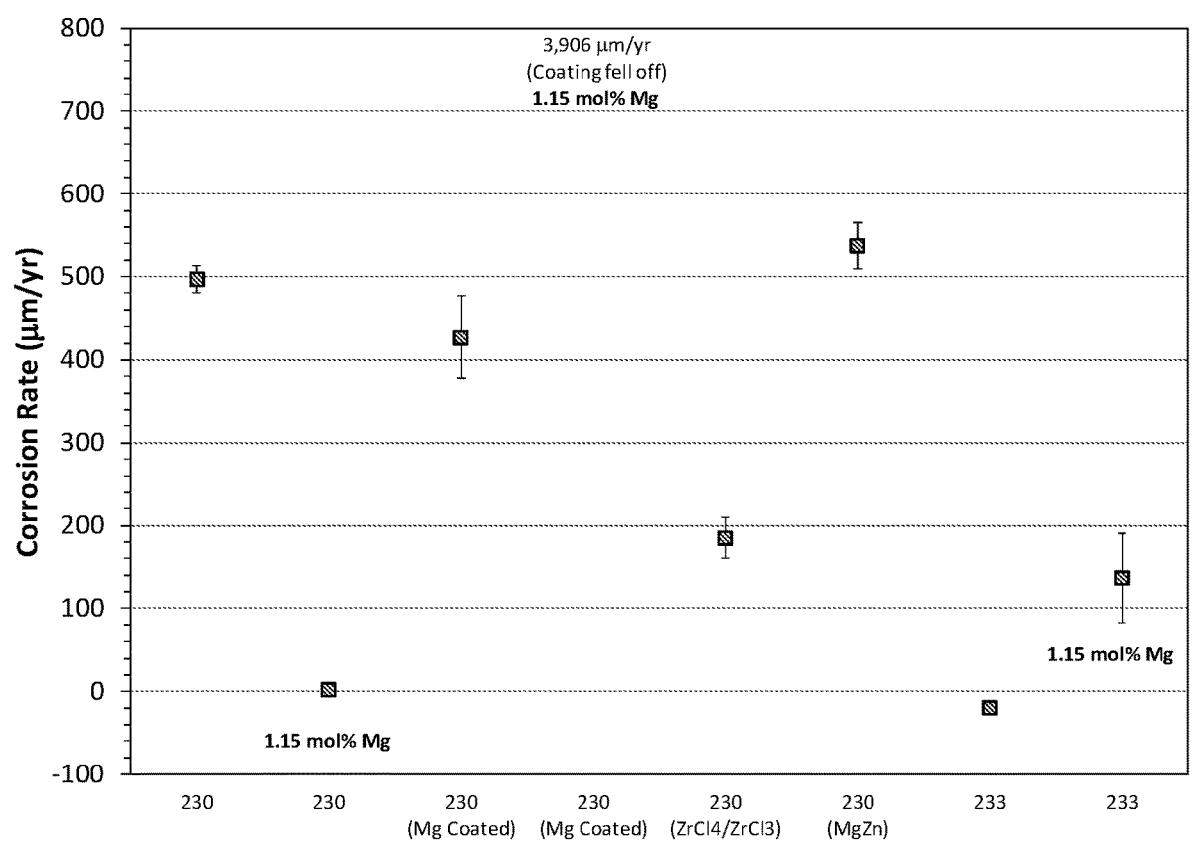
FIG. 4 is a graph of the corrosion rates for 230® alloy and 233™ alloy tested in a NaCl—KCl—MgCl₂ salt composition at 850° C. for 100 hours.
Figure 5:
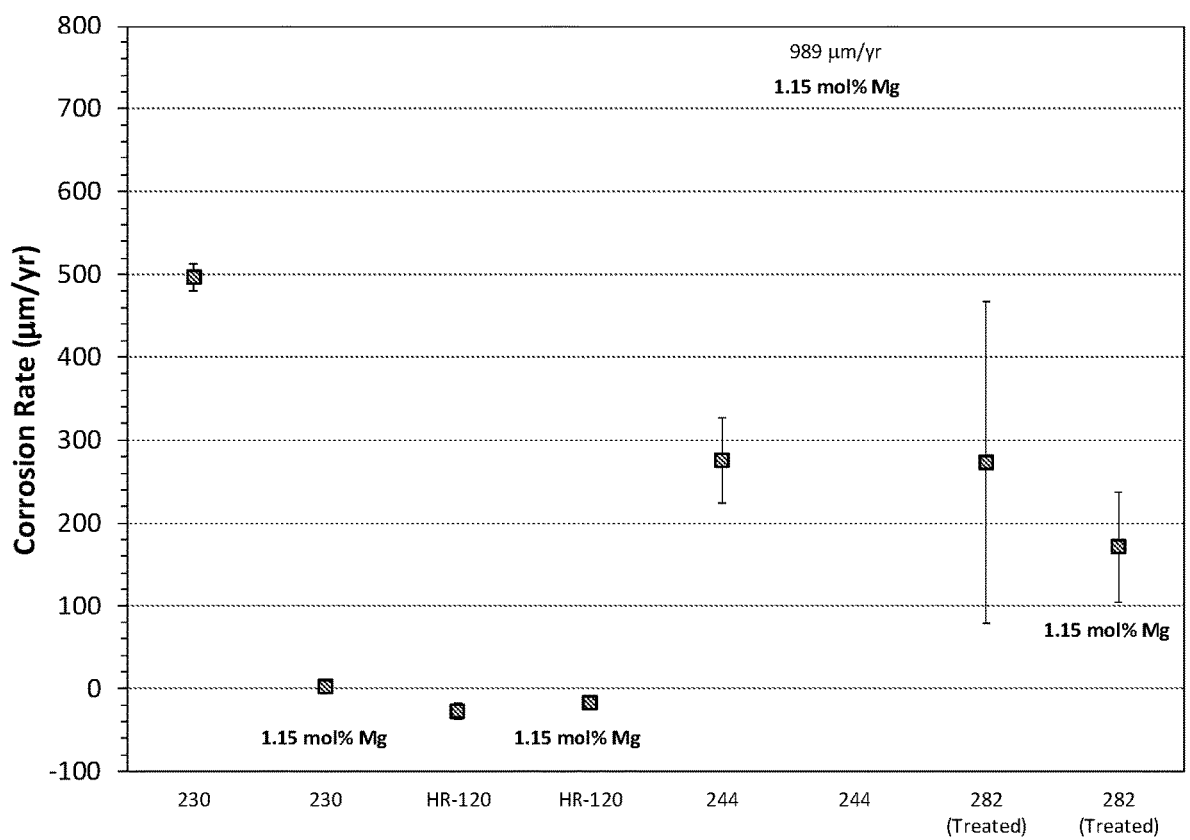
FIG. 5 is a graph, similar to FIG. 4 of the corrosion rates for 230® alloy. HR-120® alloy, 244® alloy and 282® alloy tested in a NaCl—KCl—MgCl₂ salt composition at 850° C. for 100 hours.
Figure 6:
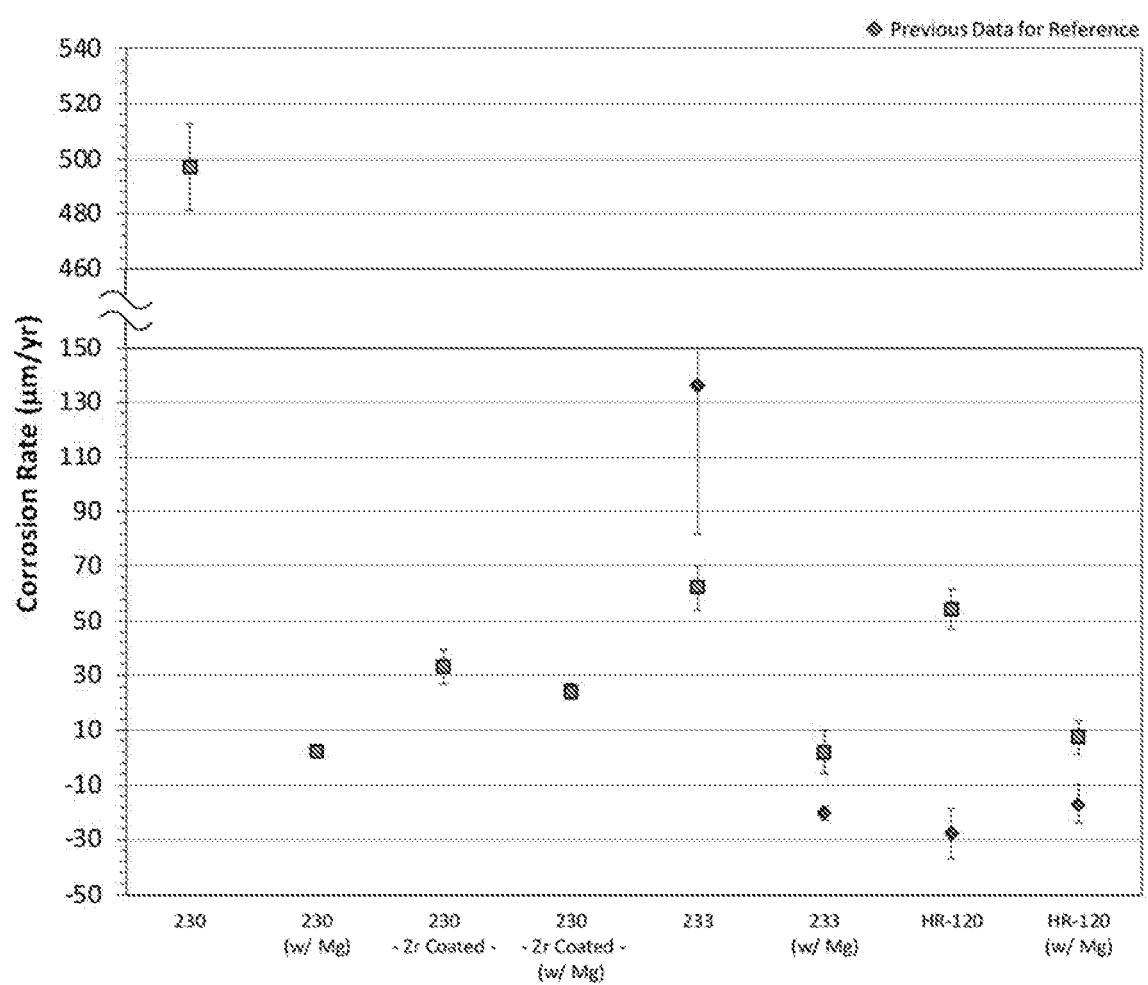
FIG. 6 is a graph, similar to FIG. 4 of the corrosion rates for 230® alloy, 233™ alloy and HR-120® alloy tested in a NaCl—KCl—MgCl₂ salt composition at 850° C. for 100 hours.

The results of the corrosion tests are reported in FIGS. 4, 5 and 6. The average of each set of the three coupons tested during the first tests is shown as a square. The average of each set of the three coupons tested during the second tests is shown as a diamond. The standard deviation for each test is shown by the whiskers extending from each point. The data shows that 233™ alloy, 230® alloy when used with a magnesium inhibitor or coated with zirconium and/or magnesium and HR-120® exhibit low corrosion rates (50-100 microns/year) at 850° C. The corrosion resistance of 233™ alloy and the corrosion resistance of HR-120® alloy were reduced to <15 microns/year in the presence of magnesium. Other reducing metals could be used in place of magnesium.

Haynes 230® alloy can be used when coated with magnesium or when the molten salt contains magnesium. Only in the presence of an active reducing metal like magnesium could the corrosion rate be reduced to below 15 microns/year.

As molten chloride solar tower systems operate at higher operating temperatures than molten nitrate solar tower system, the oxidation properties of the alloys are equally important along with the corrosion and mechanical properties of the receiver tubes and tanks. The oxidation properties are required since the receiver tubes and tanks are exposed to air on the outside of the tubes and exterior sides of the tanks. As seen below the oxidation properties of these alloys are significantly better than currently used stainless steel tank material.

Oxidation data at 1800° F. in flowing air for 1008 h (cycled weekly) for HR-120® alloy, 230® alloy, 233™ alloy, Inconel 800HT®, 304 stainless steel and 316 stainless steel are given Table 2 below. Accordingly to the manufacturer Alloys 800, 800H and 800HT have the same nickel, chromium and iron contents and generally display similar corrosion resistance.

TABLE 2

Oxidation Resistance

| Alloy | Metal Loss mils (μm) | Avg. Met. Aff. mils, (μm) | Max. Met. Aff. mils, (μm) |
|---|---|---|---|
| 233 | 0.0 (0) | 0.4 (8) | 0.5 (13) |
| 230 | 0.2 (5) | 1.5 (38) | 1.8 (46) |
| HR-120 | 0.4 (10) | 2.1 (53) | 2.7 (69) |
| 800HT | 0.5 (13) | 4.1 (104) | 4.7 (119) |
| 304SS | 5.5 (140) | 8.1 (206) | 9.5 (241) |
| 316SS | 12.3 (312) | 14.2 (361) | 14.8 (376) |

Metal Loss = (A-B)/2
Avg. Internal Penetration = C
Max. Internal Penetration = D
Avg. Metal Affected = Metal Loss + Avg. Internal Pen.
Max. Metal Affected = Metal Loss + Max. Internal Pen.

230® alloy, 233™ alloy, and HR-120® alloy also have the desired mechanical properties for use in absorption tubes, heat exchangers and storage tanks that contain molten chloride salts at temperatures from 650° C. up to as high as 1000° C. These properties are:

Creep Rupture Strength (1700° F./10 ksi)—Transverse
   233™ Alloy=523 hours
   230® Alloy=121 hours
   HR-120® Alloy=25 hours Creep Rupture Strength @ 1400° F./15 ksi (Plate/bar)
   230® Alloy=8200 hours
   HR-120® Alloy=200 hours
   304 stainless steel=10 hours
   316 stainless steel=100 hours (RT %) Thermal Stability of Alloys 1000 hours/1400° F.
   230® Alloy=33%
   HR-120® Alloy=24%
   233™ Alloy=16.5%

LCF Properties of Alloys (Cycles to Failure)
   760° C./Strain Range=1%; R=−1.0
     HR-120® Alloy=2220
     230® Alloy=1097
   870° C./Strain Range=1%; R=−1.0
     HR-120® Alloy=1284
     230® Alloy=228

230® alloy and 233™ alloy retain their mechanical properties over the working range of 350-1000° C. when in contact with molten chlorides while HR-120® alloy retains mechanical properties over the working temperature range of 350-800° C. All three alloys can be used as storage tank material. Since the storage tank operates at lower temperatures than the receiver tubes, the use of low cost HR120® alloy as construction material for tank with adequate strength optimizes the capital cost of the plant. For concentrating solar plants operating up to 800° C., HR-120°, 230®, and 233™ alloys can also be used for all components that carry or hold the molten salt. HR120® alloy should only be used as material of construction for thermal storage tanks in concentrating solar power plants operating above 800° C. The receiver's cost is minimized by utilizing autogenously welded and bead worked tubes and the storage tank's cost is minimized with using HR-120® alloy explosion clad layer on lower cost stainless steel material.

It is therefore surprising that 233™ alloy and HR-120® alloy whose composition is not very different to that of the commercial alloys mentioned above, gave corrosion rates in molten KCl—NaCl—MgCl$_2$ about 10 times lower than that of Haynes H-230® used without magnesium as a coating or in the molten salt and about 30-40 times lower than that observed for Haynes NS-163® alloy and Incoloy® 800H alloy. Specifically, 233™ alloy and HR-120® alloy showed corrosion of 50-60 microns/year instead of 500-700 microns/year for 230® alloy and 2000-3000 microns/year for NS-163® alloy and Incoloy® 800H alloy (all tested for 100 hours at 850° C., static conditions). In the presence of Mg, both 233™ alloy and HR-120® alloy also demonstrated very low corrosion (NMT 10 microns/year).

The nominal composition of Haynes 230® alloy is 22% chromium, 14% tungsten, 2% molybdenum, 5% or less cobalt, 3% or less iron, 0.5% manganese, 0.4% silicon, 0.5% or less niobium, 0.3% aluminum, 0.1% titanium, 0.1% carbon, 0.015% or less boron, 0.02% lanthanum, the balance 57% being nickel plus impurities. The 230® alloy coupons tested had this composition. Alloy compositions that contain elements within the following ranges in weight percent are expected to have the same properties described herein for 230® alloy: 20% to 24% chromium, 13% to 15% tungsten, 1% to 3% molybdenum, up to 3% iron, up to 5% cobalt, 0.3% to 1.0% manganese, 0.25 to 0.75% silicon, 0.2 to 0.5% aluminum, 0.5% to 0.15% carbon, 0.005% to 0.05% lanthanum, up to 0.1% titanium, up to 0.5% niobium, up to 0.015% boron, up to 0.03% phosphorous, up to 0.015% sulfur and the balance being nickel plus impurities.

European Patent No. EP 2 971 205 B1 covers and contains technical information about Haynes 233™ alloy. The nominal composition of this alloy is 19% chromium, 19% cobalt, 7.5% molybdenum, 0.5% titanium, 3.3% aluminum, 1.5%, or less iron, 0.4% or less manganese, 0.20% or less silicon, 0.10% carbon, 0.004% boron, 0.5% lanthanum. 0.3% or less tungsten, 0.025% or less vanadium, 0.3% zirconium, the balance 48% being nickel plus impurities. The 233™ alloy coupons tested had this composition. The patent teaches that the composition of alloys which have been discovered to possess the properties of 233™ alloy may contain: 15 to 20 wt. % chromium (Cr), 9.5 to 20 wt. % cobalt (Co), 7.25 to 10 wt. % molybdenum (Mo), 2.72 to 3.89 wt. % aluminum (Al), silicon (Si) present up to 0.6 wt. %, and carbon (C) present up to 0.15 wt. %. Titanium is present at a minimum level of 0.02 wt. %, but a level greater than 0.2% is preferred. Niobium (Nb) may be also present to provide strengthening, but is not necessary to achieve the desired properties. An overabundance of Ti and/or Nb may increase the propensity of an alloy for strain-age cracking. Titanium should be limited to no more than 0.75 wt. %, and niobium to no more than 1 wt. %. The broadest range, intermediates range and narrow range for the major elements for alloys having the properties of 233™ alloy are listed in Table 3.

TABLE 3

233 ™ Alloy Major Element Ranges (in wt. %)

| Element | Broad range | Intermediate range | Narrow range |
|---|---|---|---|
| Ni | Balance | Balance | Balance |
| Cr | 15 to 20 | 16 to 20 | 18 to 20 |
| Co | 9.5 to 20 | 15 to 20 | 18 to 20 |
| Mo | 7.25 to 10 | 7.25 to 9.75 | 7.25 to 8.25 |
| Al | 2.72 to 3.89 | 2.9 to 3.7 | >3 up to 3.5 |

Haynes HR-120® alloy is the commercial version of the alloy compositions disclosed in U.S. Pat. No. 4,981,647. This is an iron-nickel-chromium alloy having a nominal composition in weight percent of 33% iron, 37% nickel, 25% chromium, 3% or less cobalt, 1% or less molybdenum, 0.5 or less tungsten, 0.7% manganese, 0.6% silicon, 0.7% columbium, 0.1% aluminum, 0.05% carbon, 0.02% nitrogen, 0.004% boron, 0.5% or less copper and 0.2% or less titanium. The patent for this alloy teaches that a composition falling within these ranges in weight percent will have the desired properties: 25% to 45% nickel, 12% to 32% chromium, 0.1% to 2.0% columbium, up to 4.0% tantalum, up to 1.0% vanadium, up to 2.0% manganese, up to 1.0% aluminum, up to 5% molybdenum, up to 5% tungsten, up to 0.2% titanium, up to 2% zirconium, up to 5% cobalt, up to 0.1% yttrium, up to 0.1% lanthanum, up to 0.1% cesium, up to 0.1% other rare earth metals, up to about 0.20% carbon, up to 3% silicon, about 0.05% to 0.50% nitrogen, up to 0.02% boron and the balance being iron plus impurities.

Although we have shown and described present preferred embodiments of our solar tower system, it should be distinctly understood that our invention is not limited thereto but may be variously embodied within the scope of the following claims.

We claim:

1. An improved solar tower system of the type having absorption tubes, a storage tank and a heat exchanger all of which contain a molten salt heat transfer media having a temperature greater than 650° C. and the molten salt is in contact with interior surfaces of the absorption tubes, a storage tank and a heat exchanger, wherein the improvement comprises the molten salt being a chloride salt at a temperature greater than 650° C. up to 800° C., at least one of the absorption tubes, the storage tank and the heat exchanger being made of an alloy that contains in weight percent 25% to 45% nickel, 12% to 32% chromium, 0.1% to 2.0% columbium, up to 4.0% tantalum, up to 1.0% vanadium, up to 2.0% manganese, up to 1.0% aluminum, up to 5% molybdenum, up to 5% tungsten, up to 0.2% titanium, up to 2% zirconium, up to 5% cobalt, up to 0.1% yttrium, up to 0.1% lanthanum, up to 0.1% cesium, up to 0.1% other rare earth metals, up to about 0.20% carbon, up to 3% silicon, about 0.05% to 0.50% nitrogen, up to 0.02% boron and the balance being iron plus impurities.

2. An improved solar tower system of claim 1 wherein at least one of the absorption tubes, the storage tank and the heat exchanger being made of an alloy that contains in weight percent 30% to 42% nickel, 20% to 32% chromium, at least one of 0.2% to 1.0% columbium, 0.2% to 4.0% tantalum, and 0.05% to 1.0% vanadium, up to 0.2% carbon, about 0.05% to 0.50% nitrogen, 0.001% to 0.02% boron, up to 0.2% titanium and the balance being iron plus impurities.

3. The improved solar tower system of claim 1 wherein at least one of the absorption tubes, the storage tank and the heat exchanger is made of an alloy that contains in weight percent about 37% nickel, about 25% chromium, about 3% cobalt, about 1% molybdenum, about 0.5% tungsten, about 0.7% columbium, about 0.7% manganese, about 0.6% silicon, about 0.2% nitrogen, about 0.1% aluminum, about 0.05% carbon, about 0.004% boron and the balance being iron plus impurities.

4. An improved solar tower system of claim 1 wherein absorption tubes, a storage tank and a heat exchanger contain a molten salt heat transfer media having a temperature greater than 650° C. and at least one of the absorption tubes, the storage tank and the heat exchanger have a corrosion rate <60 μm at 850° C. in molten chloride salts without corrosion inhibitors.

5. The improved solar tower system of claim 4 wherein the alloy has corrosion rate <60 μm at 850° C. in molten chloride salts with Mg as corrosion inhibitor.

6. The improved solar tower system of claim 4 wherein the alloy has corrosion rate <60 μm at 850° C. in molten chloride salts with Zr as corrosion inhibitor.

7. An improved solar tower system of the type having absorption tubes, a storage tank and a heat exchanger all of which contain a molten salt heat transfer media having a temperature greater than 650° C. and the molten salt is in contact with interior surfaces of the absorption tubes, a storage tank and a heat exchanger, wherein the improvement comprises the molten salt being a chloride salt, at least one corrosion inhibitor in the molten salt or on at least one of the interior surfaces of the absorption tubes, the storage tank and the heat exchanger and at least one of the absorption tubes, the storage tank and the heat exchanger being made of an alloy that contains in weight percent 20% to 24% chromium, 13% to 15% tungsten, 1% to 3% molybdenum, up to 3% iron, up to 5% cobalt, 0.3% to 1.0% manganese, 0.25 to 0.75% silicon, 0.2 to 0.5% aluminum, 0.5% to 0.15% carbon, 0.005% to 0.05% lanthanum, up to 0.1% titanium, up to 0.5% niobium, up to 0.015% boron, up to 0.03% phosphorous, up to 0.015% sulfur and the balance being nickel plus impurities.

8. An improved solar tower system of claim 7 wherein at least one of the absorption tubes, the storage tank and the heat exchanger is made of an alloy that contains in weight percent about 22% chromium, about 14% tungsten, about 2% molybdenum, up to 3% iron, up to 5% cobalt, about 0.5% manganese, about 0.4% silicon, up to 0.5% niobium, about 0.3% aluminum, up to 0.1% titanium, about 0.1% carbon, about 0.02% lanthanum, up to about 0.015% boron and the balance being nickel plus impurities.

9. The improved solar tower system of claim 8 wherein the molten salt heat transfer media has a temperature greater than 800° C.

10. An improved solar tower system of the type having absorption tubes, a storage tank and a heat exchanger all of which contain a molten salt heat transfer media having a temperature greater than 650° C. and the molten salt is in contact with interior surfaces of the absorption tubes, a storage tank and a heat exchanger, wherein the improvement comprises the molten salt being a chloride salt, at least one corrosion inhibitor in the molten salt or on at least one of the interior surfaces of the absorption tubes, the storage tank and the heat exchanger and at least one of the absorption tubes, the storage tank and the heat exchanger being made of an alloy that contains in weight percent 18% to 20% chromium, 18% to 20% cobalt, 3.0% to 3.5% aluminum, 7% to 8% molybdenum, 0.4% to 0.8% tantalum, 0.4% to 0.6% titanium, 0.1% to 0.4% manganese, up to 0.3% tungsten, up to 1.5% iron, 0.04 to 0.2% silicon, 0.08% to 0.12% carbon, up to 0.015% phosphorus, up to 0.015% sulfur, 0.002% to 0.006% boron, 0.001% to 0.025% yttrium, 0.01% to 0.05% zirconium and the balance being nickel plus impurities.

11. The improved solar tower system of claim 10 wherein the alloy contains in weight percent about 19% chromium, about 19% cobalt, about 3.25% aluminum, about 7.5% molybdenum, about 0.5% tantalum, about 0.56% titanium, about 0.2% manganese, about 0.05% tungsten, about 1.0% iron, about 0.14% silicon, about 0.10% carbon, less than 0.002% phosphorus, less than 0.002% sulfur, about 0.002% boron, about 0.007% yttrium, about 0.02% zirconium and the balance being nickel plus impurities.

12. The improved solar tower system of claim 10 wherein the molten salt heat transfer media has a temperature greater than 800° C.

* * * * *